(12) United States Patent
Dowling

(10) Patent No.: US 6,478,232 B1
(45) Date of Patent: Nov. 12, 2002

(54) COMPACT OPTICALLY READABLE DATA ENCODING

(76) Inventor: Frank Dowling, 2 Ken Pl., Port Jefferson, NY (US) 11776

( * ) Notice: Subject to any disclaimer, the term of this patent is extended or adjusted under 35 U.S.C. 154(b) by 0 days.

(21) Appl. No.: 09/880,499

(22) Filed: Jun. 12, 2001

(51) Int. Cl.[7] .............................................. G06K 19/06
(52) U.S. Cl. ...................................... 235/494; 235/454
(58) Field of Search ................................. 235/494, 454

(56) References Cited

U.S. PATENT DOCUMENTS 5,170,044 A * 12/1992 Pastor ........................ 235/494

FOREIGN PATENT DOCUMENTS

JP          63-19983          * 1/1988

* cited by examiner

*Primary Examiner*—Harold I. Pitts
(74) *Attorney, Agent, or Firm*—Galgano & Burke

(57) ABSTRACT

Methods for optically encoding data in a compact space include arranging a plurality of dots within a circle. According to the invention, the location of the dot within the circle defines the meaning of the dot. According to two embodiments of the invention, the dots are connected by lines and a starting point is indicated for decoding the dots in sequence. According to another embodiment, the dots are decoded from left to right. According to another embodiment, a plurality of circular arrays are stacked to conserve space.

20 Claims, 5 Drawing Sheets

COMPACT OPTICALLY READABLE DATA ENCODING

BACKGROUND OF THE INVENTION

1. Field of the Invention

The invention relates to optically readable data codes. More particularly, the invention relates to optically readable data encoding which is space efficient.

2. Brief Description of the Prior Art

There are many different types of optically readable data codes in use today. The most common optically readable code is the universal product code (UPC) also known informally as the bar code. The UPC and other bar codes consist of a plurality of vertical lines, horizontally spaced apart. Each line or group of lines represents a digit or alphabetical character. Depending on which bar code is used, meaning is imparted by changing the thickness of the lines, the spacing of the lines, or the height of the lines. In any case, bar codes are written and read linearly, e.g. from left to right. Thus, the amount of data encoded in a bar code is severely limited by the amount of horizontal space available. For example, most bar codes used today encode only about ten digits per linear inch of bar code.

SUMMARY OF THE INVENTION

It is therefore an object of the invention to provide methods for encoding data.

It is also an object of the invention to provide methods for encoding data in an optically readable format.

It is another object of the invention to provide methods for encoding data in a compact optically readable format.

In accord with these objects which will be discussed in detail below, the methods according to the invention include arranging dots within a circle such that each dot represents a numeric or alphanumeric digit. The dots are arranged in such a manner that their sequence can be determined.

According to one embodiment of the invention, a circle is divided into nine sectors, each sector representing a different digit. Dots are placed in sectors to indicate digits and connected by lines to indicate the proper sequence of the digits. In this embodiment, the first digit is represented by a large dot and all of the following digits represented by smaller dots. The zero digit is represented by placing a dot on the circumference of the circle. Alignment indicium is preferably provided so that the orientation of the circle can be properly determined. Secondary indicium may be provided to alter the meaning of the sectors, e.g. to distinguish numerical digits from alphabetical characters.

According to a second embodiment, a plurality of circles are arranged concentrically and divided into four quadrants. A numeric or alphanumeric digit value is indicated by a dot on a circle in a quadrant. The number of different digit values which can be represented by a single dot is thus equal to four times the number of circles. Dots are connected by lines to indicate their sequence. Scanning begins at the center of the concentric circle array following a line to the first dot, then follows lines from the first dot to each subsequent dot. Depending on the resolution of the encoding and decoding devices, quite a few dots can be arranged in a single small circular array.

According to a third embodiment of the invention, a plurality of line segments are arranged inside a circle. Each line segment has four portions and each portion has n number of divisions such that each line segment is capable of defining one of 4 n unique data values depending on where a dot is placed on the line segment. The line segments are arranged in an order such that they are read sequentially.

According to a fourth embodiment of the invention, data is encoded in a plurality of circular arrays according to any of the three methods described above and the plural circular arrays are stacked in order to conserve space. When decoding the data, the circular arrays are unstacked and laid out linearly.

Additional objects and advantages of the invention will become apparent to those skilled in the art upon reference to the detailed description taken in conjunction with the provided figures.

DETAILED DESCRIPTION

Figure 1:
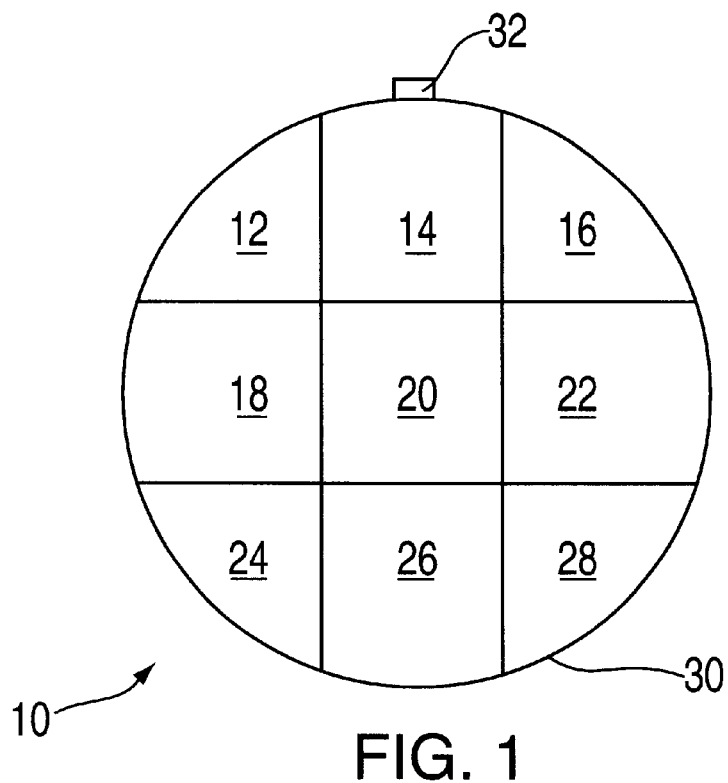
FIG. 1 is a schematic illustration of a circular array for data encoding according to a first embodiment of the invention.

Turning now to FIG. 1, a circular array 10 according to the invention is divided into nine sectors 12, 14, 16, 18, 20, 22, 24, 26, 28 bounded by a circumference 30. The circular array 10 is also preferably provided with an indicium 32 which is used to align the array in the proper orientation for encoding/decoding. As shown in FIG. 1, the indicium 32 is located just outside the circumference 30 at the "12 o'clock" position. It will be appreciated, however, that the indicium 32 could be located anywhere so long as its relationship to the sectors is understood. According to this embodiment of the invention, ten unique data values can be represented by placing a dot in the circular array 10. Each of the nine sectors represents one value and the circumference represents a tenth value.

Figure 2:
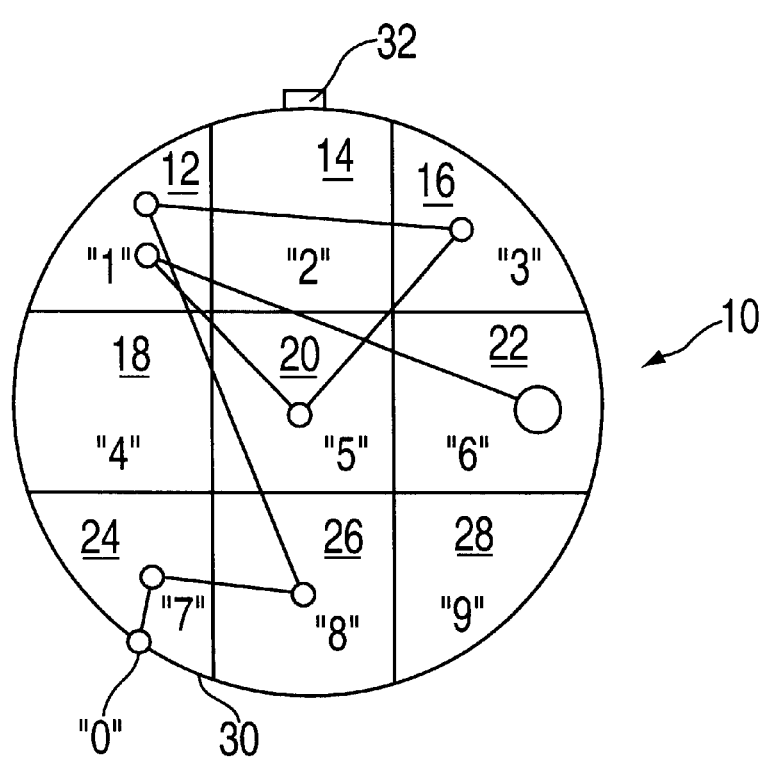
FIG. 2 is a schematic illustration of the number "61531870" encoded in the circular array of FIG. 1.

FIG. 2 illustrates how the numeral "61531870" is encoded using the array 10. As shown in FIG. 2, the values in "quotation marks" are the values assigned to the ten different parts of the circular array. Also as shown in FIG. 2, eight dots appear in the array 10, each dot representing one of the eight digits in the numeral "61531870". It will be appreciated that one of the dots is larger than the others and appears in sector 22 which has been assigned the value "6". A line appears to connect the sector 22 with a smaller dot in sector 12 which has been assigned the value "6". Following the connecting lines from one dot to the next, the numeral "61531870" is easily decoded.

Those skilled in the art will appreciate that the number of numeric digits which can be encoded in a single circular array depends on the physical size of the array as well as the resolution of the encoding and decoding devices. Presently, encoding devices (printers) and decoding devices (scanners) having a resolution of 1200 dots per inch (dpi) are readily available and inexpensive. The present invention contemplates even high resolution encoding/decoding devices utilizing short wavelength lasers. It will also be appreciated that the encoding process may be performed in manners other than "printing" as that term is commonly understood. Encoding may be accomplished by engraving, etching, photo chemically exposing, or by holographic imprinting.

Figure 3:
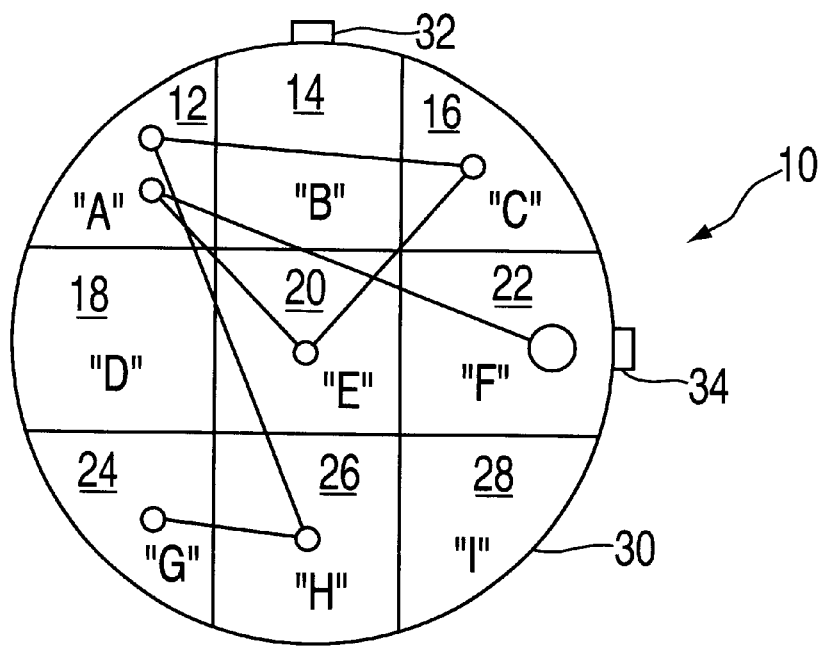
FIG. 3 is a schematic illustration of the alphanumeric string "FAECAHG" using the circular array of FIG. 1 with a secondary indicium.
Figure 4:
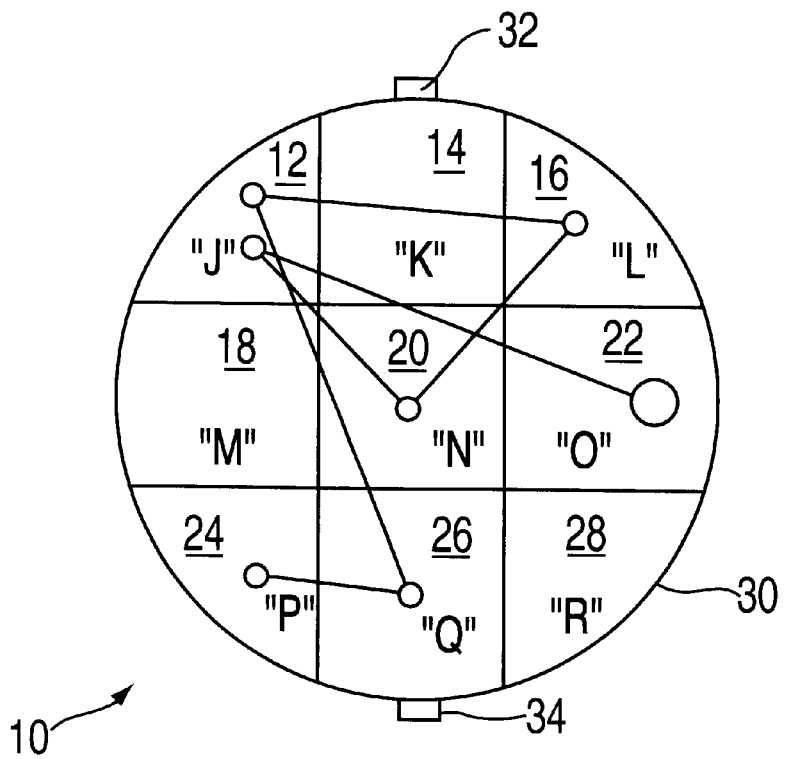
FIG. 4 is a schematic illustration of the alphanumeric string "OJNLJQP" using the circular array of FIG. 1 with a secondary indicium.

Turning now to FIGS. 3 and 4, the meaning of the nine sectors 12–28 and the circumference 30 of the circular array 10 may be altered with the use of a secondary indicium 34 which is distinguishable from the indicium 32. As shown in FIG. 3, the indicium 32 is a solid mark at the "12 o'clock" position of the circular array and the indicium 34 is a hollow mark at the "three o'clock" position of the circular array. As an example, FIG. 3 shows that when the secondary indicium is at the "three o'clock" position, the values of the sectors 12–28 are understood to be the alphabetic characters shown in "quotation marks", e.g. letters "A" through "I". Thus, the dots arranged in FIG. 3 represent the alphabetic string "FAECAHG".

FIG. 4 shows, as an example, that when the secondary indicium 34 is located at the "6 o'clock" position, the nine sectors 12–28 are understood to represent letters "J" through "R". Thus, the dots arranged in FIG. 4 represent the alphabetic string "OJNLJQP". Those skilled in the art will appreciate that by placing the secondary indicium at the "9 o'clock" position, the remainder of the alphabet can be represented. It will also be appreciated that the secondary indicium may be located at more than three different locations, thereby expanding the number of different data values which can be represented by a single dot.

It will be appreciated, however, that the first embodiment of the invention is limited to encoding only ten unique data values per circular array. In other words, even though the number of data digits encoded in a single circular array may be very large, each digit may only have one of ten values. In order to expand the flexibility of the circular array, a second embodiment of the invention is provided.

Figure 5:
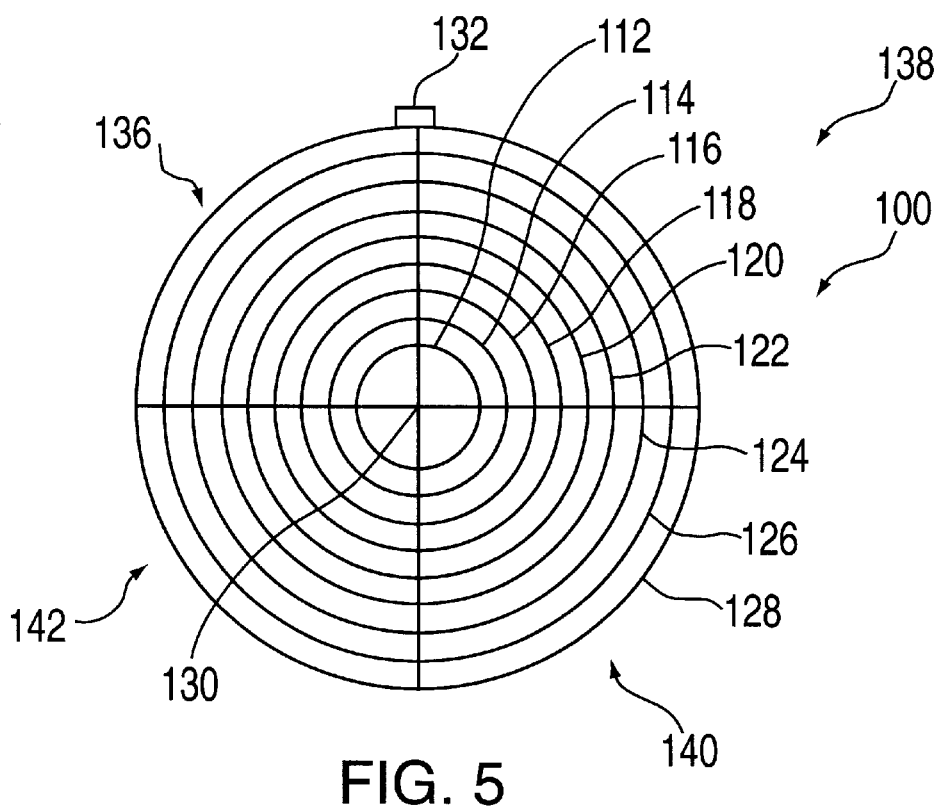
FIG. 5 is a schematic illustration of a circular array for data encoding according to a second embodiment of the invention.

Turning now to FIG. 5, a second embodiment of a circular array 100 according to the invention includes a plurality of concentric circles, e.g. 112–128, a discernable center 130 and four discernable quadrants 136–142. An indicium 132 is preferably provided to ascertain the location of the first quadrant 136. By placing a dot on a circle in a quadrant, a unique data value is represented. The number of unique data values which may be represented is equal to four (the number of quadrants) times the number of concentric circles. It will be appreciated that the number of unique data values can be increased by increasing the number of concentric circles and/or increasing the number of quadrants (called "sectors" when greater than four).

According to an exemplary embodiment, nine circles and four quadrants are used and are assigned values according to Table 1, below.

TABLE 1

| Quadrant | Circle | Value |
|---|---|---|
| I | 1 | A |
| I | 2 | B |
| I | 3 | C |
| I | 4 | D |
| I | 5 | E |
| I | 6 | F |
| I | 7 | G |
| I | 8 | H |
| I | 9 | I |
| II | 1 | J |
| II | 2 | K |
| II | 3 | L |
| II | 4 | M |
| II | 5 | N |
| II | 6 | O |
| II | 7 | P |
| II | 8 | Q |
| II | 9 | R |
| III | 1 | S |
| III | 2 | T |
| III | 3 | U |
| III | 4 | V |
| III | 5 | W |
| III | 6 | X |
| III | 7 | Y |
| III | 8 | Z |
| III | 9 | 0 |
| IV | 1 | 1 |
| IV | 2 | 2 |
| IV | 3 | 3 |
| IV | 4 | 4 |
| IV | 5 | 5 |
| IV | 6 | 6 |
| IV | 7 | 7 |
| IV | 8 | 8 |
| IV | 9 | 9 |

As seen in Table 1, in the first quadrant, the circles (counted from inner to outer) represent the letters "A" through "I". In the second quadrant, the circles represent the letters "J" through "R". In the third quadrant, the circles represent the letters "S" through "Z" and the numeral zero. In the fourth quadrant, the circles represent the numerals "1" through "9".

Figure 6:
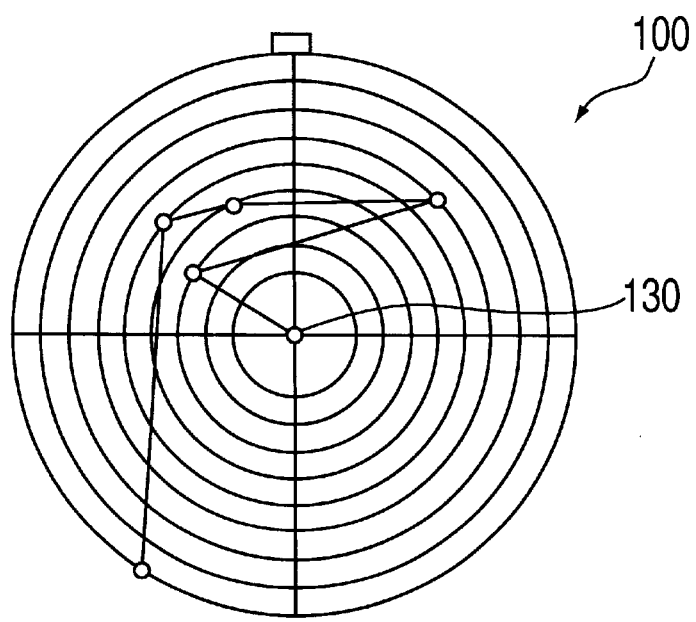
FIG. 6 is a schematic illustration of the alphanumeric string "CODE9" using the circular array of FIG. 5.

According to this embodiment of the invention, decoding begins by following a line from the center 130 of the array 100 to the first dot and following the lines thereafter to each subsequent dot. As seen in FIG. 6, the first dot is in circle 3 of quadrant I, representing the letter "C". The second dot is in circle 6 of quadrant II, representing the letter "O". The third dot is on circle 4 of quadrant I representing the letter "D". The fourth dot is on circle 5 in quadrant I, representing the letter "E". The last dot is located on circle 9 in quadrant IV, representing the numeral "9". Thus, the code in FIG. 6 represents the alphanumeric string "CODE9".

Figure 7:
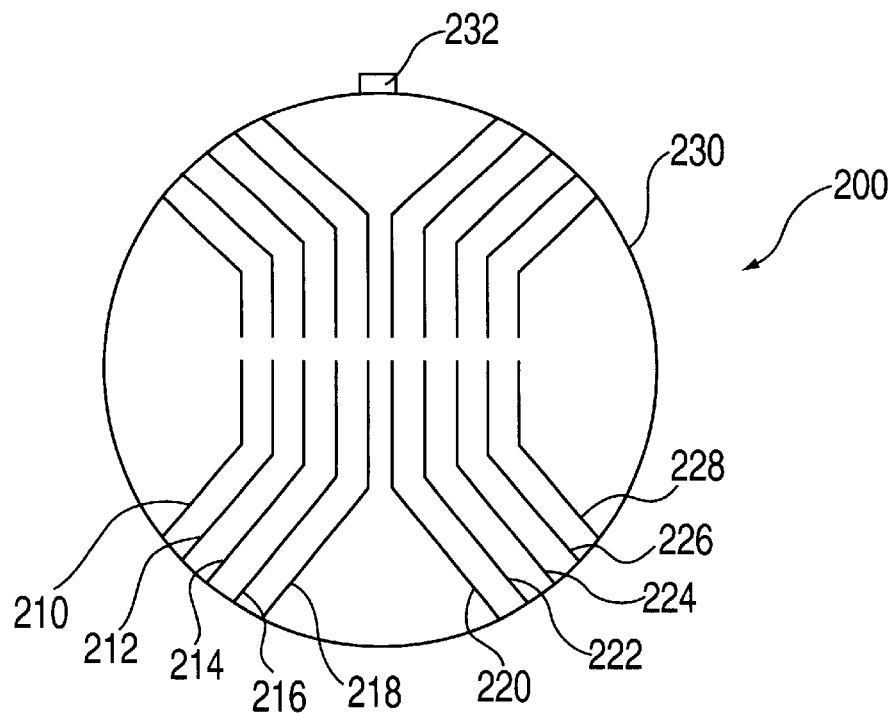
FIG. 7 is a schematic illustration of a circular array for data encoding according to a third embodiment of the invention.
Figure 8:
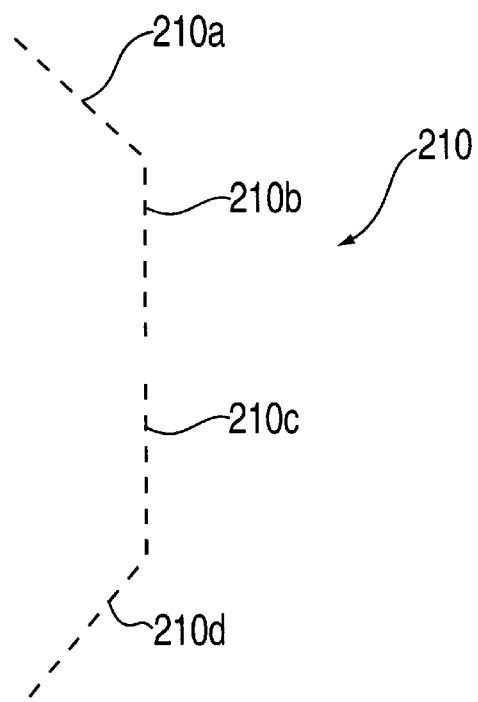
FIG. 8 is an enlarged detail of one of the line segments in the array of FIG. 7.
Figure 9:
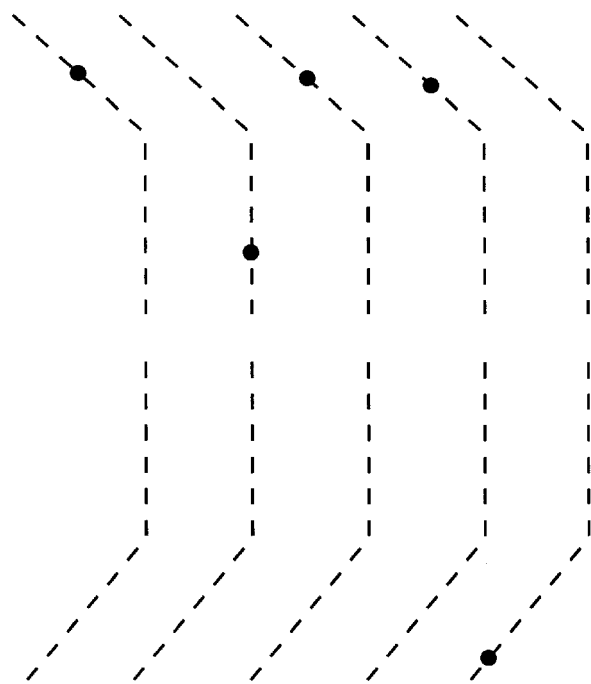
FIG. 9 is an enlarged detail of five line segments of the array of FIG. 7 illustrating the alphanumeric string "CODE9"

Turning now to FIGS. 7–9, a third embodiment of an array 200 according to the invention includes a plurality of line segments, e.g. 210–228, spaced apart from each other and enclosed by a circumference 230. The array preferably includes indicium 232 for orienting the array. As seen best in FIG. 8, each line segment, e.g. 210, has four discernable portions, e.g. 210a–210d. Each portion has nine discrete locations, shown as dashes in FIG. 8. Thus, the number of unique values which can be represented by placing a dot on a line segment is thirty-six. As an example, values can be assigned as shown in Table 2, below.

TABLE 2

| Portion | Location | Value |
|---------|----------|-------|
| A | 1 | A |
| A | 2 | B |
| A | 3 | C |
| A | 4 | D |
| A | 5 | E |
| A | 6 | F |
| A | 7 | G |
| A | 8 | H |
| A | 9 | I |
| B | 1 | J |
| B | 2 | K |
| B | 3 | L |
| B | 4 | M |
| B | 5 | N |
| B | 6 | O |
| B | 7 | P |
| B | 8 | Q |
| B | 9 | R |
| C | 1 | S |
| C | 2 | T |
| C | 3 | U |
| C | 4 | V |
| C | 5 | W |
| C | 6 | X |
| C | 7 | Y |
| C | 8 | Z |
| C | 9 | 0 |
| D | 1 | 1 |
| D | 2 | 2 |
| D | 3 | 3 |
| D | 4 | 4 |
| D | 5 | 5 |
| D | 6 | 6 |
| D | 7 | 7 |
| D | 8 | 8 |
| D | 9 | 9 |

According to this embodiment of the invention, decoding is performed by reading the locations of dots on line segments from left to right. As seen in FIG. 9, the first dot is in position 3 of portion "a" on the first line segment, representing the letter "C". The second dot is in position 6 of portion "b", representing the letter "O". The third dot is on position 4 of portion "a", representing the letter "D". The fourth dot is on position 5 in portion "a", representing the letter "E". The last dot is located on position 9 in portion "d", representing the numeral "9". Thus, the code in FIG. 9 represents the alphanumeric string "CODE9".

Though not shown in FIGS. 7–9, it will be appreciated that other registration indicia could be provided, for example at one end of each line. Furthermore, it will be appreciated that operation instructions (e.g., add, subtract, etc.) could be provided between lines.

Figure 10:
FIG. 10 is a schematic illustration of a plurality of circular arrays stacked according to a fourth embodiment of the invention.
Figure 11:
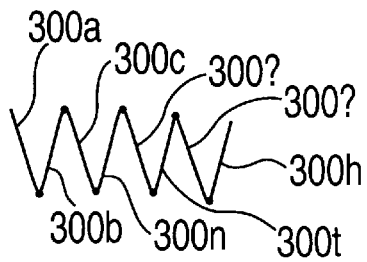
FIG. 11 is a schematic illustration of the stack of FIG. 10 partially unstacked.
Figure 12:
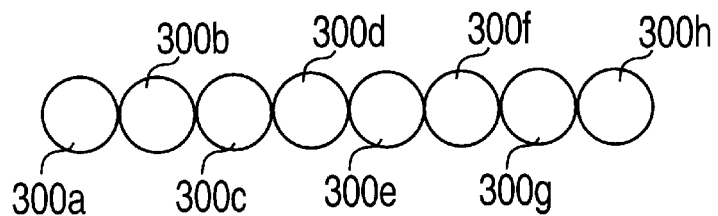
FIG. 12 is a schematic illustration of the plural circular arrays of FIGS. 10 and 11, unstacked and arranged linearly.

Referring now to FIGS. 10–12, according to a fourth embodiment of the invention, a plurality of circular arrays, e.g. 300a–300h, are stack 300 to conserve space. Prior to decoding the circular arrays, they are unstacked as shown in FIGS. 11 and 12. Each circular array is then decoded in order. Although FIG. 12 shows the unstacked arrays in a linear string, other orientations such as a rectangular matrix may be preferable.

There have been described and illustrated herein methods for optically encoding data in a compact space. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for optically encoding data in a compact space, said method comprising:

a) defining regions of a circle as having unique data values;

b) encoding a datum value by placing a dot in the region of the circle having the corresponding defined value;

c) repeating step "b)" for a plurality of data;

d) indicating the order in which the dots were placed.

2. A method according to claim 1, wherein:

said step of defining includes dividing the circle into a plurality of sectors.

3. A method according to claim 1, further comprising:

e) placing registration indicium to indicate the orientation of the circle.

4. A method according to claim 1, wherein:

said step of defining includes defining a plurality of concentric circular regions.

5. A method according to claim 4, wherein:

said step of defining includes defining a plurality of radial sectors.

6. A method according to claim 1, wherein:

the first dot is larger than the last dot.

7. A method according to claim 1, wherein:

the first dot is in the center of the circle.

8. A method according to claim 1, wherein:

said step of indicating includes connecting the dots with lines.

9. A method according to claim 1, wherein:

said step of defining includes defining portions of line segments located within the circle.

10. A method according to claim 9, wherein:

said step of indicating includes arranging the line segments in a discernable order.

11. A data carrier, comprising:

a) a circular array, regions of said circular array being defined as representing unique values;

b) a plurality of dots placed on said circular array, each dot representing a unique value defined by where it is placed on said circular array; and c) sequencing means for determining the order in which said dots are sequenced.

12. A data carrier according to claim 11, wherein:

said regions of said of said circular array include a plurality of sectors.

13. A data carrier according to claim 11, further comprising:

d) registration indicium indicating the orientation of the circular array.

14. A data carrier according to claim 11, wherein:

said regions of said circular array include a plurality of concentric circular regions.

15. A data carrier according to claim 14, wherein:

said regions of said circular array include a plurality of radial sectors.

16. A data carrier according to claim 11, wherein:

said plurality of dots includes a first dot and a last dot and the first dot is larger than the last dot.

17. A data carrier according to claim 11, wherein:

said plurality of dots includes a first dot and a last dot and the first dot is in the center of the circular array.

18. A data carrier according to claim 11, wherein:

said sequencing means includes connecting the dots with lines.

19. A data carrier according to claim 11, wherein:

said regions of said circular array include line segments located within the circular array.

20. A data carrier according to claim 11, wherein:

said circular array includes a plurality of circular arrays arranged in a stack.

* * * * *